US010310858B2

(12) United States Patent
Lukefahr et al.

(10) Patent No.: US 10,310,858 B2
(45) Date of Patent: Jun. 4, 2019

(54) CONTROLLING TRANSITION BETWEEN USING FIRST AND SECOND PROCESSING CIRCUITRY

(71) Applicant: THE REGENTS OF THE UNIVERSITY OF MICHIGAN, Ann Arbor, MI (US)

(72) Inventors: Andrew Lukefahr, Ann Arbor, MI (US); Shruti Padmanabha, Ann Arbor, MI (US); Reetuparna Das, Ann Arbor, MI (US); Scott Mahlke, Ann Arbor, MI (US); Jiecao Yu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 351 days.

(21) Appl. No.: 15/063,651

(22) Filed: Mar. 8, 2016

(65) Prior Publication Data
US 2017/0262285 A1 Sep. 14, 2017

(51) Int. Cl.
G06F 9/38 (2018.01)

(52) U.S. Cl.
CPC .......... *G06F 9/3834* (2013.01); *G06F 9/3836* (2013.01); *G06F 9/3861* (2013.01); *G06F 9/3867* (2013.01)

(58) Field of Classification Search
CPC ........ G06F 9/461; G06F 9/485; G06F 9/3834; G06F 9/3838; G06F 9/30043; G06F 9/30189; G06F 9/3836; G06F 9/3867
(Continued)

(56) References Cited

U.S. PATENT DOCUMENTS 7,359,276 B1 * 4/2008 Turney ................ G06F 13/4059
365/189.011
2009/0164812 A1 * 6/2009 Capps, Jr. ............. G06F 1/3203
713/320
(Continued)

OTHER PUBLICATIONS

Stone, Sam S., Kevin M. Woley, and Matthew I. Frank. "Address-indexed memory disambiguation and store-to-load forwarding." Proceedings of the 38th annual IEEE/ACM International Symposium on Microarchitecture. IEEE Computer Society, 2005. (Year: 2005).*
(Continued)

*Primary Examiner* — Jacob Petranek
(74) *Attorney, Agent, or Firm* — Nixon & Vanderhye P.C.

(57) ABSTRACT

Apparatus and a corresponding method for controlling a transition between use of first processing circuitry and second processing circuitry to execute program instructions are provided. Transition monitoring storage selects an entry for a load program instruction executed during the transition in dependence on a memory address from which a value is to be loaded and stores a program order timestamp for the load program instruction, unless a valid previously stored program order timestamp in the entry precedes the program order timestamp. Thus the oldest timestamp of an load instruction executed in the transition is held. At either the start or end (or both) of the transition the content of the transition monitoring storage is cleared. When a store program instruction is executed during the transition and when a further program order timestamp for the store program instruction indicates that the store program instruction precedes in program order a load program instruction already executed in the transition, program instructions which follow the store program instruction in the first and second processing circuitry are squashed and re-executed. Data hazards which could otherwise arise during the transition are
(Continued)

thus avoided by the use of transition monitoring storage which is nevertheless conveniently small.

13 Claims, 6 Drawing Sheets

(58) Field of Classification Search
    USPC .................................. 712/216, 229, 217
    See application file for complete search history.

(56) References Cited

U.S. PATENT DOCUMENTS

| | | | | |
|---|---|---|---|---|
| 2011/0213993 | A1* | 9/2011 | Greenhalgh | .......... G06F 1/3203 713/320 |
| 2014/0115279 | A1* | 4/2014 | Chirca | ................ H04L 63/0263 711/151 |
| 2014/0181501 | A1* | 6/2014 | Hicok | ................... G06F 9/5094 713/100 |
| 2014/0281402 | A1* | 9/2014 | Comparan | .......... G06F 9/30189 712/214 |
| 2015/0121048 | A1* | 4/2015 | Lukefahr | ............ G06F 9/30189 712/229 |
| 2015/0177821 | A1* | 6/2015 | Senthinathan | ...... G06F 9/30189 713/324 |
| 2016/0378486 | A1* | 12/2016 | Varma | ................... G06F 9/4893 712/229 |

OTHER PUBLICATIONS

Moshovos, Andreas, and Gurindar S. Sohi. "Streamlining inter-operation memory communication via data dependence prediction." Proceedings of the 30th annual ACM/IEEE international symposium on Microarchitecture. IEEE Computer Society, 1997. (Year: 1997).*

* cited by examiner

ON LOAD:

VALID [MEM] = 1

TIME [MEM] = TS < TIME [MEM] ? TS : TIME [MEM]

OLD_PC [MEM] = TS < TIME [MEM] ? PC : OLD_PC [MEM]

SQUASH = (TS < TIME [MEM] AND
(LOAD_LOAD_ALIAS_MODEL AND
COHERENCE_TRAFFIC))

ON STORE:

SQUASH = (TS < TIME [MEM])

US 10,310,858 B2

CONTROLLING TRANSITION BETWEEN USING FIRST AND SECOND PROCESSING CIRCUITRY

TECHNICAL FIELD

The present disclosure relates to a data processing apparatus. More particularly, it relates to controlling a transition between using first and second processing circuitry in a data processing apparatus.

BACKGROUND

A data processing apparatus which performs data processing operations in response to instructions may be provided with more than one set of processing circuitry which can execute those instructions. The apparatus can then have a configuration which allows it to switch between usage of those respective sets of processing circuitry, where the processing circuitry to use in any given period may be selected according to various criteria, depending on the particular system performance requirements.

The more than one set of processing circuitry may be rather independent of one another and this can mean that some instructions such as load and store instructions may have to be carefully handled to ensure that the independence of the sets of processing circuitry does not result in data hazard conditions arising.

SUMMARY

At least one example described herein provides an apparatus for processing data comprising: first processing circuitry to execute program instructions; second processing circuitry to execute program instructions; control circuitry to control a transition between a first state in which program instructions are executed by the first processing circuitry and a second state in which program instructions are executed by the second processing circuitry; and transition monitoring storage to select an entry for a load program instruction executed during the transition in dependence on a memory address from which a value is to be loaded and to store in the entry a program order timestamp for the load program instruction unless a valid previously stored program order timestamp in the entry precedes the program order timestamp, wherein the transition monitoring storage is responsive to a signal from the control circuitry indicating either a start or an end of the transition to clear content of the transition monitoring storage, and wherein the apparatus is responsive to execution of a store program instruction during the transition for which said entry in the transition monitoring storage is selected, and when a further program order timestamp for the store program instruction indicates that the store program instruction precedes the load program instruction in program order, to squash and re-execute program instructions which follow the store program instruction in the first and second processing circuitry.

At least one example described herein provides a method of operating apparatus for processing data comprising: controlling a transition between a first state in which program instructions are executed by first processing circuitry of the apparatus and a second state in which program instructions are executed by second processing circuitry of the apparatus; selecting an entry in transition monitoring storage for a load program instruction executed during the transition in dependence on a memory address from which a value is to be loaded; storing in the entry a program order timestamp for the load program instruction unless a valid previously stored program order timestamp in the entry precedes the program order timestamp; clearing content of the transition monitoring storage in response to a signal indicating either a start or an end of the transition; and squashing and re-executing program instructions which follow a store program instruction in the first and second processing circuitry and for which said entry in the transition monitoring storage is selected in response to execution of the store program instruction during the transition, when a further program order timestamp for the store program instruction indicates that the store program instruction precedes the load program instruction in program order.

At least one example described herein provides an apparatus for processing data comprising: first means for executing program instructions; second means for executing program instructions; means for controlling a transition between a first state in which program instructions are executed by the first means for executing program instructions and a second state in which program instructions are executed by the second means for executing program instructions; means for selecting an entry for a load program instruction executed during the transition in storage means in dependence on a memory address from which a value is to be loaded; means for storing in the entry of the storage means a program order timestamp for the load program instruction unless a valid previously stored program order timestamp in the entry precedes the program order timestamp; means for clearing content of the storage means in response to a signal indicating either a start or an end of the transition; and means for squashing and re-executing program instructions which follow a store program instruction in the first and second means for executing program instructions and for which said entry in the storage means is selected in response to execution of the store program instruction during the transition, when a further program order timestamp for the store program instruction indicates that the store program instruction precedes the load program instruction in program order.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
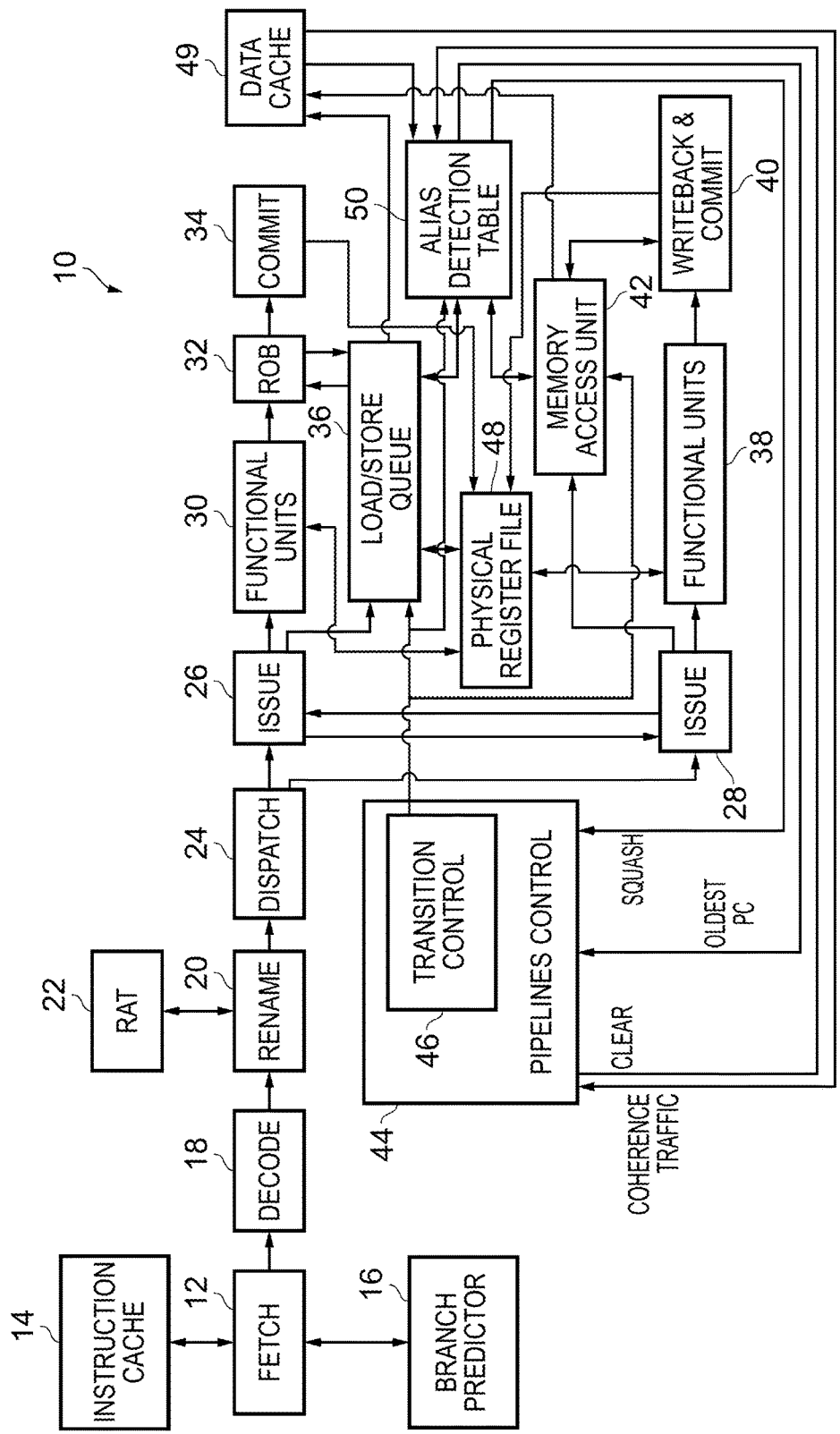
FIG. 1 schematically illustrates apparatus in one example embodiment having first and second processing circuitry to execute program instructions.

In some example embodiments there is an apparatus for processing data comprising: first processing circuitry to execute program instructions; second processing circuitry to execute program instructions; control circuitry to control a transition between a first state in which program instructions are executed by the first processing circuitry and a second state in which program instructions are executed by the second processing circuitry; and transition monitoring storage to select an entry for a load program instruction executed during the transition in dependence on a memory address from which a value is to be loaded and to store in the entry a program order timestamp for the load program instruction unless a valid previously stored program order timestamp in the entry precedes the program order timestamp, wherein the transition monitoring storage is responsive to a signal from the control circuitry indicating either a start or an end of the transition to clear content of the transition monitoring storage, and wherein the apparatus is responsive to execution of a store program instruction during the transition for which said entry in the transition monitoring storage is selected, and when a further program order timestamp for the store program instruction indicates that the store program instruction precedes the load program instruction in program order, to squash and re-execute program instructions which follow the store program instruction in the first and second processing circuitry.

The apparatus has more than one set of processing circuitry which can execute the program instructions. These may be relatively symmetric or may have notably different processing capabilities. The control circuitry controls a transition between using one set of processing circuitry and another, and it should be understood that the transition can be in either direction, i.e. in the case of first and second processing circuitry could be from using the first to using the second, or could be from using the second to using the first. The present techniques recognise that whilst in the process of transitioning between using the first processing circuitry to execute program instructions and using the second processing circuitry to execute program instructions the situation may arise that load and store instructions will be allocated to different processing circuitry. Because of the relative independence of the first and second processing circuitry, this could result in out-of-program-order execution of these instructions and a potential memory-ordering violation, potentially causing incorrect program execution. To take just a simple example, where the program instructions comprise a store instruction for storing a given register value to a specified memory location and subsequently a load instruction to retrieve a data value from that same memory location into a given register file, it will be recognised that the program order of these instructions must be preserved in order to ensure that the end result is correct, since if the program order is violated, incorrect execution may result. In order to detect this kind of "aliasing" (i.e. where both sets of processing circuitry access the same memory location), but without implementing complex circuitry to directly access the other set of processing circuitry, the present techniques provide transition monitoring storage which can be provided as a relatively simple structure and allows such alias detection to be performed.

When a load instruction is executed during the transition between the first state (instructions executed by the first processing circuitry) and the second state (instructions executed by the second processing circuitry) an entry in the transition monitoring storage is selected on the basis of the memory address specified in the load instruction. A program order timestamp for the load instruction is then stored in this entry, unless an older (i.e. earlier) timestamp is currently validly stored in that entry. In other words, the entry of the transition monitoring storage maintains a record of the oldest timestamp of a load instruction encountered for (i.e. corresponding to) this entry. It should be noted that valid entries in the transition monitoring storage are only present whilst the apparatus is in transition between the first state and the second state (and as mentioned above note that this may mean a transmission from the first state to the second state or a transition from the second state to the first state), so that the transition monitoring storage maintains a record of the oldest loads for a given memory location which have already executed.

The apparatus is further responsive to the execution of a store instruction during the transition to check the content of the transition monitoring storage. If it is found that the entry selected for the store instruction (this also being done in dependence on the address to which that store instruction is directed) shows that the timestamp of the store instruction is older (i.e. earlier) than the timestamp stored in the entry (indicating the oldest load instruction executed) then it is identified that (relative to program order) a younger (i.e. later) load instruction has been executed before the store instruction and therefore potentially has received a wrong value. Whilst the store instruction is then allowed to complete (and write a new value to memory), all subsequent (i.e. younger) instructions are squashed and re-executed to ensure that the load is successfully squashed. Since on the one hand the transition monitoring storage responds to a signal from the control circuitry (either at the beginning or end (or both) of the transition) to clear its content, which may comprise flash clearing the storage or invalidating all entries, and on the other hand due to the fact that only timestamps for load instructions are stored (and therefore both load and store timestamp (sequence) numbers do not need to be stored separately), this storage is only used during the transition and therefore can be relatively small in size. Note that the clearing of the content of the transition monitoring storage could take place at the beginning, at the end, or indeed at both the beginning and end of the transition. In fact, the clearance could in principle instead take place at some moment whilst the pipelines are not in transition, as long as the content is clear once the transition is underway and the content of the transition monitoring storage is being updated and checked. It has been found that although the relatively small size of the transition monitoring storage can in principle lead to more false positive hits, as the content of the storage is only checked during the relatively short transition phases, overall in operation of the apparatus such false positives are rare.

In some examples the apparatus is responsive to execution of a further load program instruction during the transition for which said entry in the transition monitoring storage is selected, and when a yet further program order timestamp for the further load program instruction indicates that the further load program instruction precedes the load program instruction in program order, to squash and re-execute program instructions which follow the further load program instruction in the first and second processing circuitry. For the reasons set out above, in order to ensure correct program execution, the present techniques provide for the detection of load/store aliasing, but it is further recognised that depending on the consistency model being used for the memory, it may be required to detect load-load aliasing, i.e. "younger" loads that execute ahead of "older" loads may also need to squash all following instructions to ensure that the older load does not receive a newer value, whilst the newer instruction (which executed earlier) received an older value. This may for example be a concern in cache-coherent multi-core systems.

In some examples the control circuitry is responsive to a coherence traffic signal, and squashing and re-executing the program instructions which follow the further load program instruction in the first and second processing circuitry is further dependent on the coherence traffic signal, wherein the coherence traffic signal is indicative of access to a shared data store which the apparatus shares with another apparatus. For example in a cache-coherent multi-core system, each core may be provided as an apparatus according to the present techniques, and the shared data store may for example be a data cache to which at least two of the cores share access. Where only one core is accessing the data cache, then coherency is not an issue (and there is no need for the squashing and re-executing to be enabled), but if one core receives the coherence traffic signal indicating that another core is also accessing the data cache, then load-load aliasing could result in a data hazard across the multiple cores, and the squashing and re-executing can be enabled.

In some examples the first processing circuitry has different performance characteristics to the second processing circuitry. The different performance characteristics of the two sets of processing circuitry may then dictate when the control circuitry triggers a transition between the first and second state, in order to make use of those different performance characteristics.

In some examples the first processing circuitry comprises an out-of-order execution pipeline and the second processing circuitry comprises an in-order execution pipeline. In such a configuration the out-of-order execution pipeline will then typically be capable of a higher program instruction execution performance, although at the cost of greater energy consumption, and the control circuitry may therefore switch to usage of the first processing circuitry when such high performance is required, whilst switching to the second processing circuitry when a lower performance is acceptable (and the lower energy consumption associated therewith is desirable).

In some examples the entry in the transition monitoring storage further comprises an oldest program counter value and the transition monitoring storage is responsive to the load program instruction executed during the transition to store in the entry a program counter for the load program instruction unless the valid previously stored program order timestamp in the entry precedes the program order timestamp. Accordingly, the entry in the transition monitoring storage may comprise other information than just the timestamp and in this example the provision of transition monitoring storage in which an oldest program counter value can be stored in its entries means that it can be detected which instruction (originally) caused the aliasing. Hence in such embodiments, the program order timestamp for the current load instruction is compared against a valid previously stored program order timestamp in the entry (if such exists) and if this load instruction's timestamp is older than the timestamp in the entry, the program counter for the load instruction is then stored.

In some examples the apparatus is responsive to execution of the store program instruction during the transition for which said entry in the transition monitoring storage is selected, and when the further program order timestamp for the store program instruction indicates that the store program instruction precedes the valid previously stored program order timestamp in the entry, to prevent future out-of-program-order execution of an instruction indicated by the oldest program counter value in the entry. Hence this "oldest program counter" value can be made use of the by the apparatus to avoid such aliasing in the future, in particular for example by preventing the associated instruction from executing out of program order.

In some examples the entry in the transition monitoring storage further comprises a validity bit for the entry and clearing of content by the transition monitoring storage comprises setting all validity bits to indicate invalidity. As mentioned above, clearing the content of the transition monitoring storage may be performed in a variety of ways, but the validity of each entry in the transition monitoring storage may be indicated by a validity bit for each entry and clearing may comprise setting all such validity bits to indicate invalidity. However, as mentioned above, a more thorough approach to the clearing may also be taking such as flash-clearing the storage, for example at the beginning of the transition.

In some examples the control circuitry is responsive to presence of at least one load or store program instruction in the second processing circuitry when the transition is from the first state to the second state to delay the transition until the second processing circuitry is devoid of load and store instructions, and the control circuitry is responsive to presence of at least one load or store program instruction in the first processing circuitry when the transition is from the second state to the first state to delay the transition until the first processing circuitry is devoid of load and store instructions. Once the target processing circuitry is devoid of load and store instructions in this manner, this allows the transition monitoring storage (alias detection table) to be cleared. In other words, a restriction may be imposed on the architecture that when switching between the first and second processing circuitry, the switched-to circuitry must be devoid of load and store instructions from any previous usage. This ensures that any interleaved memory instructions in the switched-from pipeline are executed correctly.

In some examples the apparatus is responsive to the transition between the first state and the second state not being active to suppress operation of the transition monitoring storage. Whilst in some examples the apparatus may merely clear the transition monitoring storage (either by marking its content as invalid or by flash clearance), the apparatus in some examples can be further such that when the transition is not taking place then operation of the transition monitoring storage is suppressed (i.e. for example all access to this component may be switched off thus helping to reduce the energy consumption of the apparatus).

In some examples the transition monitoring storage is direct indexed or direct mapped. In view of the fact that the transition monitoring storage, for the reasons given above, can be provided as a relatively small storage device, this enables a simple access or indexing mechanism to be provided which avoids the complexity of associatively searched structures, and the entries are directly indexed or directly mapped on the basis of the relevant memory address.

In some example embodiments there is a method of operating apparatus for processing data comprising: controlling a transition between a first state in which program instructions are executed by first processing circuitry of the apparatus and a second state in which program instructions are executed by second processing circuitry of the apparatus; selecting an entry in transition monitoring storage for a load program instruction executed during the transition in dependence on a memory address from which a value is to be loaded; storing in the entry a program order timestamp for the load program instruction unless a valid previously stored program order timestamp in the entry precedes the program order timestamp; clearing content of the transition monitoring storage in response to a signal indicating either a start or an end of the transition; and squashing and re-executing program instructions which follow a store program instruction in the first and second processing circuitry and for which said entry in the transition monitoring storage is selected in response to execution of the store program instruction during the transition, when a further program order timestamp for the store program instruction indicates that the store program instruction precedes the load program instruction in program order.

In some example embodiments there is a apparatus for processing data comprising: first means for executing program instructions; second means for executing program instructions; means for controlling a transition between a first state in which program instructions are executed by the first means for executing program instructions and a second state in which program instructions are executed by the second means for executing program instructions; means for selecting an entry for a load program instruction executed during the transition in storage means in dependence on a memory address from which a value is to be loaded; means for storing in the entry of the storage means a program order timestamp for the load program instruction unless a valid previously stored program order timestamp in the entry precedes the program order timestamp; means for clearing content of the storage means in response to a signal indicating either a start or an end of the transition; and means for squashing and re-executing program instructions which follow a store program instruction in the first and second means for executing program instructions and for which said entry in the storage means is selected in response to execution of the store program instruction during the transition, when a further program order timestamp for the store program instruction indicates that the store program instruction precedes the load program instruction in program order.

Some particular embodiments will now be described with reference to the figures.

FIG. 1 schematically illustrates an apparatus in one embodiment. It will be recognised that this illustration only gives an schematic overview and various components and connections with which one of ordinary skill will be familiar have been omitted for clarity. It can be seen that this data processing apparatus 10 has a pipelined structure, and moreover in fact comprises two execution pipelines. Nevertheless, these two execution pipelines are not entirely separated from one another and share some front end components such as the fetch stage 12, the instruction cache 14, the branch predictor 16, the decode stage 18, the rename stage 20, the register alias table (RAT) 22, and the dispatch stage 24. The first processing circuitry (back end execution pipeline) then comprises issue stage 26, the functional execution units 30, the reorder buffer (ROB) 32, and the commit stage 34, as well as the load/store queue 36. Correspondingly, the second processing circuitry (backend execution pipeline) comprises the issue stage 28, the functional execution units 38, the write-back and commit stage 40, and the memory access unit 42. Instructions dispatched by the dispatch unit 24 are initially received by one of the issue stages 26 and 28, which can communicate with each other. Note further that the two execution pipelines share the physical register file 48 and the data cache 49. Overall control of the two back end execution pipelines is maintained by the pipelines control circuitry 44, which as illustrated in FIG. 1 also comprises control specific to a transition between a first state when the first execution pipeline (i.e. components 26, 30, 32, 34 and 36) is used to execute the program instructions, and a second state in which the second execution pipeline (i.e. the components 28, 38, 40 and 42) are used to execute the program instructions. A particular function of the transition control 46 is to signal to the load/store queue 36 and the memory access unit 42 when the apparatus is in transition between the first state and the second state, such that each of these components during the transition can then make reference to the alias detection table (ADT) 50, which is also provided as part of the apparatus 10. The content of the alias detection table 50 and the manner in which the information therein is updated, referenced, and cleared will be described in more detail with reference to the following figures. Note however that the pipelines control unit 44 can signal to the alias detection table 50 that it should be cleared, this being done in this embodiment at the beginning and end of the transition, causing the alias detection table to flash clear its content. Specifically here, the transition control 46 signals "pipelines in transition" to control circuitry of the alias detection table in the period where the pipelines are in transition. Conversely, note also that the alias detection table can signal both a "squash" signal to the pipelines control 44 and also an oldest program counter (PC) value. One of ordinary skill in the art will be familiar with a pipeline's ability to squash and cause to be re-executed one or more instructions, and further detail is not given here for brevity. Finally note that the pipelines control 44 also receives the coherence traffic signal from the data cache 49, which indicates when another apparatus (typically another core in a multi-core system) is currently accessing the data cache 49.

Figure 2:
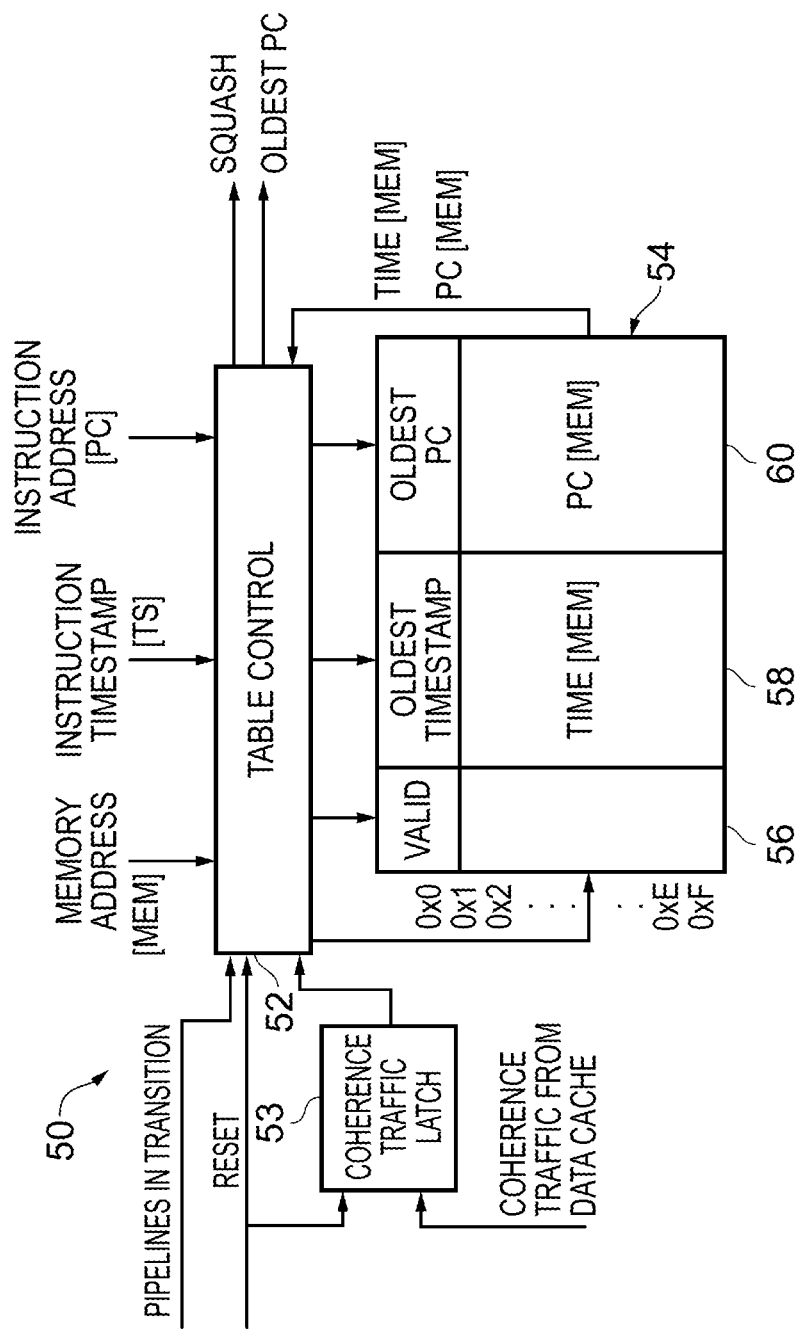
FIG. 2 schematically illustrates more detail of the alias detection table shown in FIG. 1.

FIG. 2 schematically illustrates in more detail some components of the alias detection table 50 of FIG. 1. As may be seen in FIG. 2 this alias detection table comprises the table 54 itself together with an associated table control circuitry 52 and coherence traffic latch 53. The alias detection table can store values in a number of different entries, which are indexed according to a portion of the memory address of the corresponding instruction as indicated in FIG. 2 by the indexing values 0x0 to 0xF. Each entry comprises a validity bit 56, an oldest timestamp 58, and an oldest PC value 60. The load store queue 36 and the memory access unit 42 of the respective back end pipelines shown in FIG. 1 make access to the alias detection table 50 when the apparatus is in transition between the first state and the second state. When either the load store queue 36 or the memory access unit 42 executes a load instruction during the transition, the corresponding memory address [MEM], the load instruction timestamp [TS], and the program counter value [PC] for this instruction are passed to the table control 52 of the alias detection table 50. The memory address is then used to generate the index into the table 54 itself, and, if the entry is not already marked as valid, then it is updated to be valid. If there was not already a valid entry stored for this indexed entry, then the table is simply updated with the timestamp of the instruction and its associated program counter value. However, if a valid entry was already present (i.e. if during this transition a load instruction has already been executed which indexed into the same entry) then the timestamp of that previous load instruction stored in the entry and the timestamp of the load instruction currently encountered are compared and the smaller of the two (indicating the older instruction) is stored in the entry. Also, the program counter value for this entry is updated to correspond to the older load instruction and hence if the timestamp (TS) of the current load instruction is less than the timestamp stored for this entry, then this indicates that the current load instruction is older than the previous load instruction and thus the oldest PC value 60 is updated with the program counter value of the current load instruction. The coherence traffic latch 53 holds a value to indicate if another core (apparatus) has accessed the shared data cache 49 during this transition. This component is provided to support a memory consistency model being implemented that requires load-load aliasing to be detected, such as in the use of the shared data cache described. If the coherence traffic signal is received during a transition (and the transition state being signalled to the table control 52 by the transition control 46 of the pipelines control 44), then this value is latched until the reset signal (issued in this example embodiment at the beginning of the transition) to clear the table is received from the transition control 46.

Thereafter, when a store instruction is encountered (or another load instruction if the above-mentioned memory consistency model is being implemented) the content of the alias detection table 50 is checked if the timestamp present in the alias detection table for the relevant entry is larger than the store instruction's timestamp (or load instruction's timestamp for the load-load aliasing checking). Note that if this is true then this means that a load instruction with a larger (i.e. younger) timestamp has already executed and received a potentially incorrect value from memory. Hence, this causes the "squash" signal to be generated which is passed to the pipelines control 44 in order to cause all subsequent instructions currently in the pipelines which follow the store to be squashed (and therefore also re-executed).

Figures 3, 4:
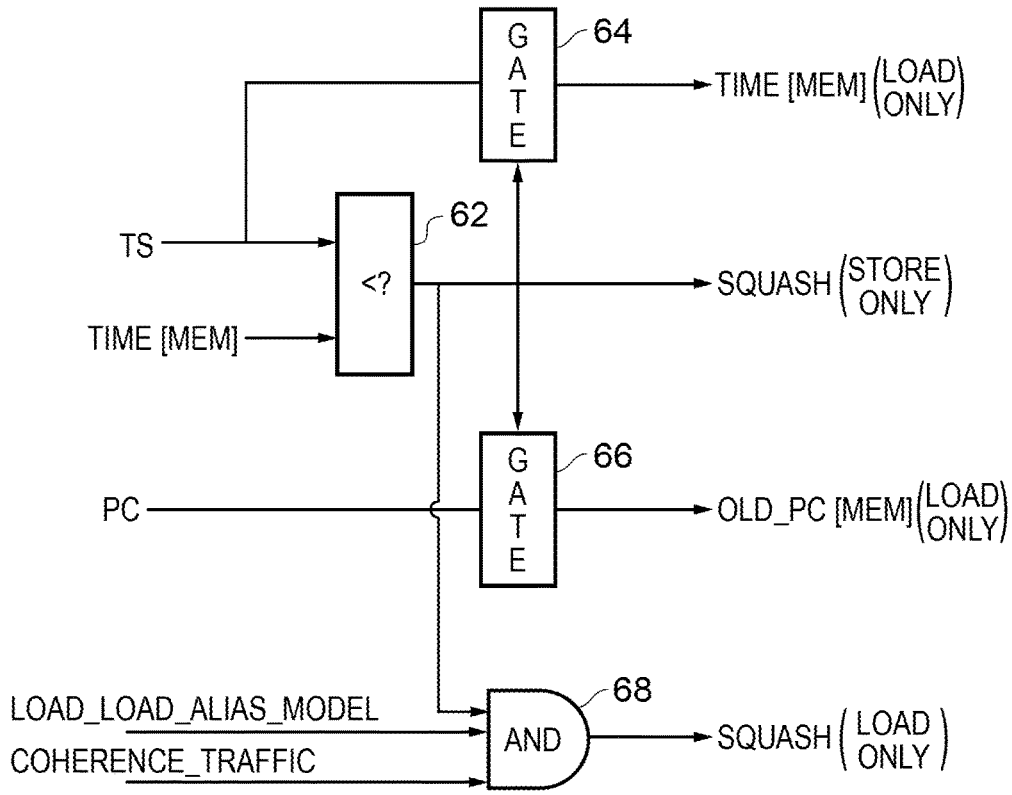
FIG. 3 schematically illustrates some detail of the table control shown in FIG. 2.
FIG. 4 shows example logic which the table control shown in FIG. 2 uses in one embodiment when a load or store instruction is encountered.

FIG. 3 schematically illustrates an example configuration of some of the table control circuitry 52 in one embodiment where comparison circuitry 62, gates 64 and 66, and a triple input AND gate 68 are provided. Note that the 3-input AND gate 68 has one control input indicating the consistency model mode (i.e. the load-load aliasing mode), such that when load-load aliasing should be detected and when the coherence traffic value latched in the latch 53 indicates coherence traffic during this transition, the squash signal can be generated for subsequently detected loads as well as the default for this to be potentially generated for store instructions. The gate 64 provides that the timestamp of the load instruction is only stored as the oldest timestamp for the relevant entry when the timestamp of the load instruction currently being executed is smaller than the timestamp of the previously executed load instruction (as stored in the relevant entry). The gate 66 provides that the program counter of the load instruction is only stored as the oldest PC value for the relevant entry when the timestamp of the load instruction currently being executed is smaller than the timestamp of the previously executed load instruction (as stored in the relevant entry).

FIG. 4 shows example pseudo-code which implements the same logic as that carried out by circuitry of FIG. 3.

Figure 5:
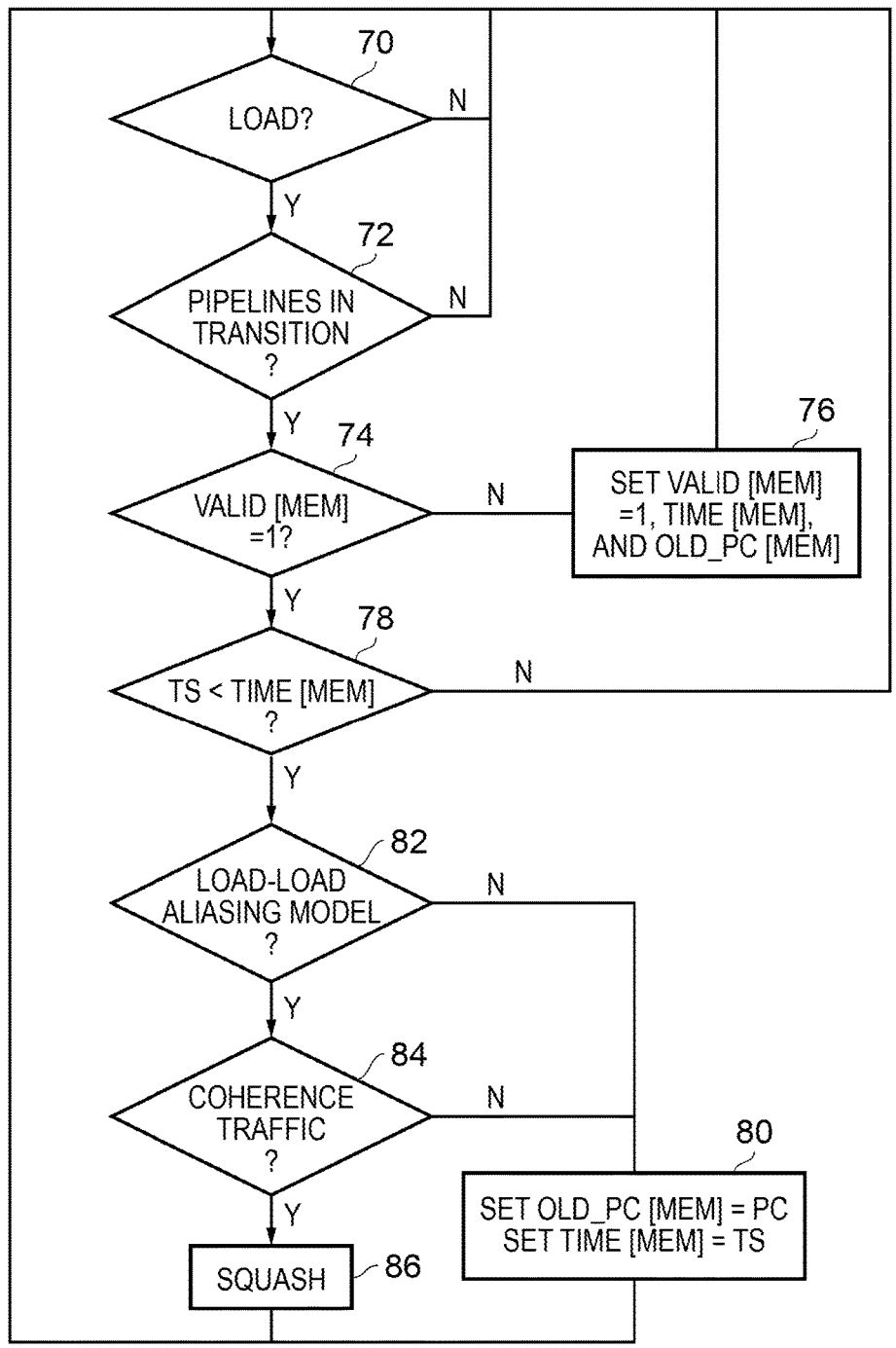
FIG. 5 schematically illustrates a sequence of steps, which are taken according to the method of one embodiment when a load instruction is encountered when transitioning between use of first processing circuitry and second processing circuitry.

FIG. 5 shows the sequence of steps which are taken in the method of one embodiment when operating an alias detection table such as that shown in FIGS. 1 and 2. Step 70 determines if a load instruction is being executed and only if this is the case does the flow proceed to step 72, where it is determined if the pipelines are currently in transition from use of one to the other. If those two conditions are true then an examination of the content of the alias detection table is then carried out and firstly at step 74 it is determined if the corresponding entry (as determined by the memory address of the relevant instruction) indicates a valid entry. If this is not true then the flow proceeds to step 76, where the entry is now marked as valid, and the timestamp and program counter value of this load instruction are stored. The flow returns to step 70, awaiting the next load instruction to be executed. If however at step 74 it is determined that the existing entry is already valid, then at step 78 it is determined if the timestamp (TS) of this load instruction is less than the stored "oldest timestamp" (TIME[MEM]) stored in this entry. If it is not, them then the flow returns to step 70. If it is however, then at step 82 it is determined if the load-load aliasing model is being used. If this is not the case then the flow proceeds to step 80 where the stored oldest PC value is updated by the program counter for this load instruction and TIME[MEM] is set to the current timestamp TS, and the flow proceeds back to step 70. However when load-load aliasing is being monitored, and if coherence traffic has been indicated (step 84), then potential the execution of two load instructions by different cores with respect to the same memory location causes the squash signal to activated at step 86, to ensure that subsequent instructions are squashed and re-executed. Step 80 is also reached if it is determined at step 84 that no coherence traffic has been indicated. From both step 80 and step 86, the flow returns to step 70.

Figure 6:
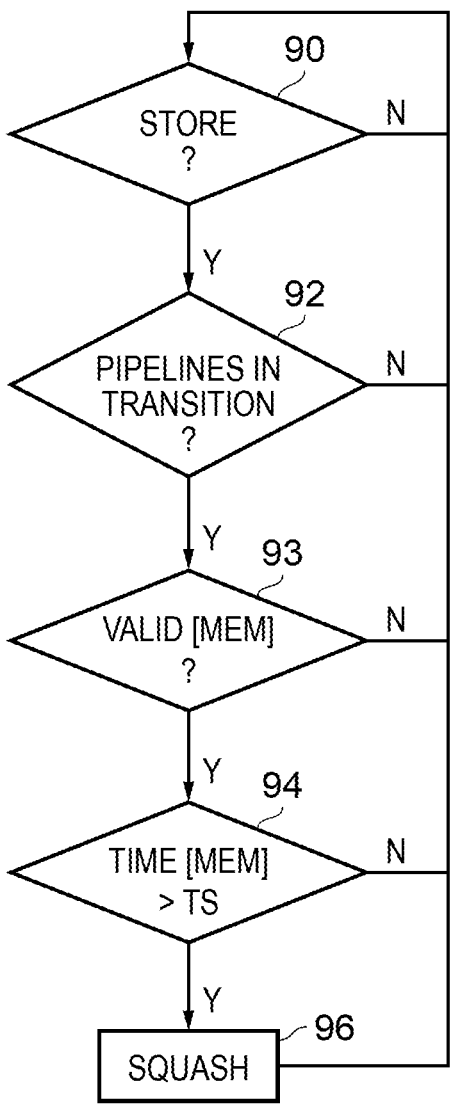
FIG. 6 schematically illustrates a sequence of steps, which are taken in the method of one embodiment when a store instruction is encountered when transitioning between use of first processing circuitry and second processing circuitry.

FIG. 6 schematically illustrates a sequence of steps which are taken when a store instruction is encountered, this being the first check at step 90. This being the case then at step 92 it is determined if the pipelines are currently in transition and only if this is also true is a check made at step 93 as to whether there is a valid entry in the table. If this is also true then at step 94 the timestamp stored in the relevant entry in the alias detection table is greater than (younger than) the timestamp of the store instruction. If this is not the case then the flow simply returns to step 90, but when it is the case the squash signal is activated at step 96, allowing the store instruction to complete but ensuring that all subsequent instructions currently in the pipelines are squashed and re-executed.

Figure 7:
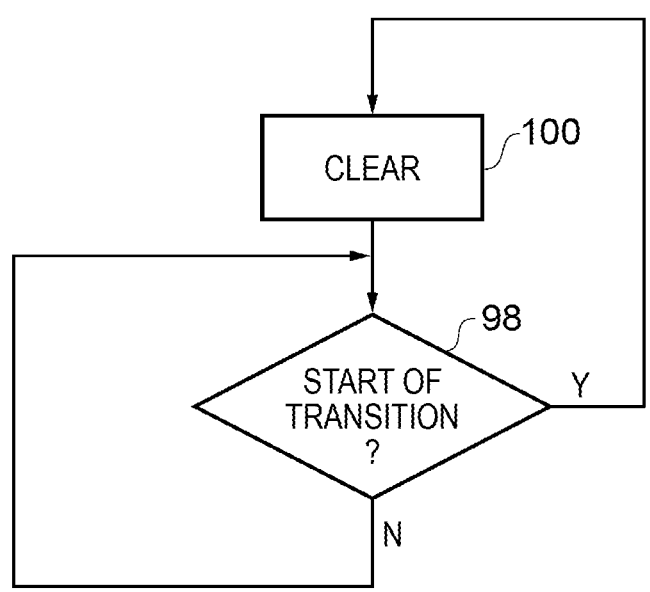
FIG. 7 schematically illustrates some steps taken to clear the content of transition monitoring storage in one embodiment.

FIG. 7 is a simple illustration of the method of clearing the content of the alias detection table at the beginning (only) of a transition, which is indicated by the transition control circuitry 46 in the example embodiment of FIG. 1 (reset signal). Thus, when the start of a transition at step 98 is identified, the table is caused to be cleared at 100. Otherwise the flow loops on step 98 either during the remainder of the transition itself or outside of the transition phase.

In brief overall summary an apparatus and a corresponding method for controlling a transition between use of first processing circuitry and second processing circuitry to execute program instructions are provided. Transition monitoring storage selects an entry for a load program instruction executed during the transition in dependence on a memory address from which a value is to be loaded and stores a program order timestamp for the load program instruction, unless a valid previously stored program order timestamp in the entry precedes the program order timestamp. Thus the oldest timestamp of an load instruction executed in the transition is held. At either the start or end (or both) of the transition the content of the transition monitoring storage is cleared. When a store program instruction is executed during the transition and when a further program order timestamp for the store program instruction indicates that the store program instruction precedes in program order a load program instruction already executed in the transition, program instructions which follow the store program instruction in the first and second processing circuitry are squashed and re-executed. Data hazards which could otherwise arise during the transition are thus avoided by the use of transition monitoring storage which is nevertheless conveniently small.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus for processing data comprising:
   first processing circuitry to execute program instructions;
   second processing circuitry to execute program instructions;
   control circuitry to control a transition between a first state in which program instructions are executed by the first processing circuitry and a second state in which program instructions are executed by the second processing circuitry; and
   transition monitoring storage to select an entry for a load program instruction executed during the transition in dependence on a memory address from which a value is to be loaded and to store in the entry a program order timestamp for the load program instruction unless a valid previously stored program order timestamp in the entry precedes the program order timestamp, wherein the transition monitoring storage is responsive to a signal from the control circuitry indicating either a start or an end of the transition to clear content of the transition monitoring storage,
   and wherein the apparatus is responsive to execution of a store program instruction during the transition, when said entry in the transition monitoring storage is selected for the store program instruction, and when a further program order timestamp for the store program instruction indicates that the store program instruction precedes the load program instruction in program order, to squash and re-execute program instructions which follow the store program instruction in the first and second processing circuitry.

2. The apparatus as claimed in claim 1, wherein the apparatus is responsive to execution of a further load program instruction during the transition for which said entry in the transition monitoring storage is selected, and when a yet further program order timestamp for the further load program instruction indicates that the further load program instruction precedes the load program instruction in program order, to squash and re-execute program instructions which follow the further load program instruction in the first and second processing circuitry.

3. The apparatus as claimed in claim 2, wherein the control circuitry is responsive to a coherence traffic signal, and squashing and re-executing the program instructions which follow the further load program instruction in the first and second processing circuitry is further dependent on the coherence traffic signal, wherein the coherence traffic signal is indicative of access to a shared data store which the apparatus shares with another apparatus.

4. The apparatus as claimed in claim 1, wherein the first processing circuitry has different performance characteristics to the second processing circuitry.

5. The apparatus as claimed in claim 4, wherein the first processing circuitry comprises an out-of-order execution pipeline and the second processing circuitry comprises an in-order execution pipeline.

6. The apparatus as claimed in claim 1, wherein the entry in the transition monitoring storage further comprises an oldest program counter value and the transition monitoring storage is responsive to the load program instruction executed during the transition to store in the entry a program counter for the load program instruction unless the valid previously stored program order timestamp in the entry precedes the program order timestamp.

7. The apparatus as claimed in claim 6, wherein the apparatus is responsive to execution of the store program instruction during the transition for which said entry in the transition monitoring storage is selected, and when the further program order timestamp for the store program instruction indicates that the store program instruction precedes the load program instruction in program order, to prevent future out-of-program-order execution of an instruction indicated by the oldest program counter value in the entry.

8. The apparatus as claimed in claim 1, wherein the entry in the transition monitoring storage further comprises a validity bit for the entry and clearing of content by the transition monitoring storage comprises setting all validity bits to indicate invalidity.

9. The apparatus as claimed in claim 1, wherein the control circuitry is responsive to presence of at least one load or store program instruction in the second processing circuitry when the transition is from the first state to the second state to delay the transition until the second processing circuitry is devoid of load and store instructions, and the control circuitry is responsive to presence of at least one load or store program instruction in the first processing circuitry when the transition is from the second state to the first state to delay the transition until the first processing circuitry is devoid of load and store instructions.

10. The apparatus as claimed in claim 1, wherein when the transition between the first state and the second state is not active, the apparatus is responsive to the not active transition to suppress operation of the transition monitoring storage.

11. The apparatus as claimed in claim 1, wherein the transition monitoring storage is direct indexed or direct mapped.

12. A method of operating apparatus for processing data comprising:
   controlling a transition between a first state in which program instructions are executed by first processing circuitry of the apparatus and a second state in which program instructions are executed by second processing circuitry of the apparatus;

selecting an entry in transition monitoring storage for a load program instruction executed during the transition in dependence on a memory address from which a value is to be loaded;
storing in the entry a program order timestamp for the load program instruction unless a valid previously stored program order timestamp in the entry precedes the program order timestamp;
clearing content of the transition monitoring storage in response to a signal indicating either a start or an end of the transition; and
squashing and re-executing program instructions which follow a store program instruction in the first and second processing circuitry and for which store program instruction said entry in the transition monitoring storage is selected in response to execution of the store program instruction during the transition, when a further program order timestamp for the store program instruction indicates that the store program instruction precedes the load program instruction in program order.

13. An apparatus for processing data comprising:
first means for executing program instructions;
second means for executing program instructions;
means for controlling a transition between a first state in which program instructions are executed by the first means for executing program instructions and a second state in which program instructions are executed by the second means for executing program instructions;
means for selecting an entry for a load program instruction executed during the transition in storage means in dependence on a memory address from which a value is to be loaded;
means for storing in the entry of the storage means a program order timestamp for the load program instruction unless a valid previously stored program order timestamp in the entry precedes the program order timestamp;
means for clearing content of the storage means in response to a signal indicating either a start or an end of the transition; and
means for squashing and re-executing program instructions which follow a store program instruction in the first and second means for executing program instructions and for which store program instruction said entry in the storage means is selected in response to execution of the store program instruction during the transition, when a further program order timestamp for the store program instruction indicates that the store program instruction precedes the load program instruction in program order.

* * * * *